Oct. 7, 1924.
J. C. DORSEY ET AL
1,510,984
FOLDING GLARE DIMMER FOR AUTOMOBILE WINDSHIELDS
Original Filed Sept. 16, 1922
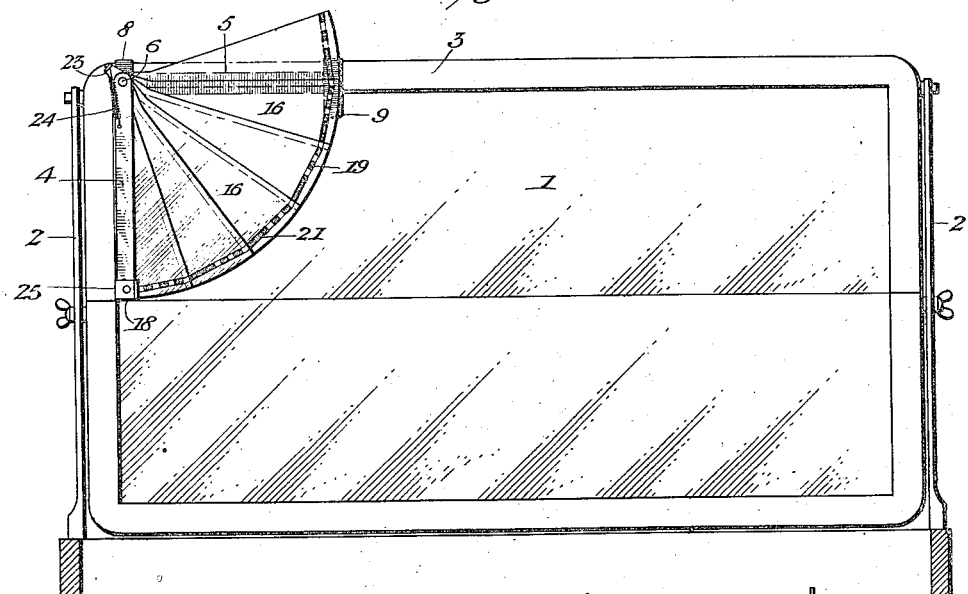
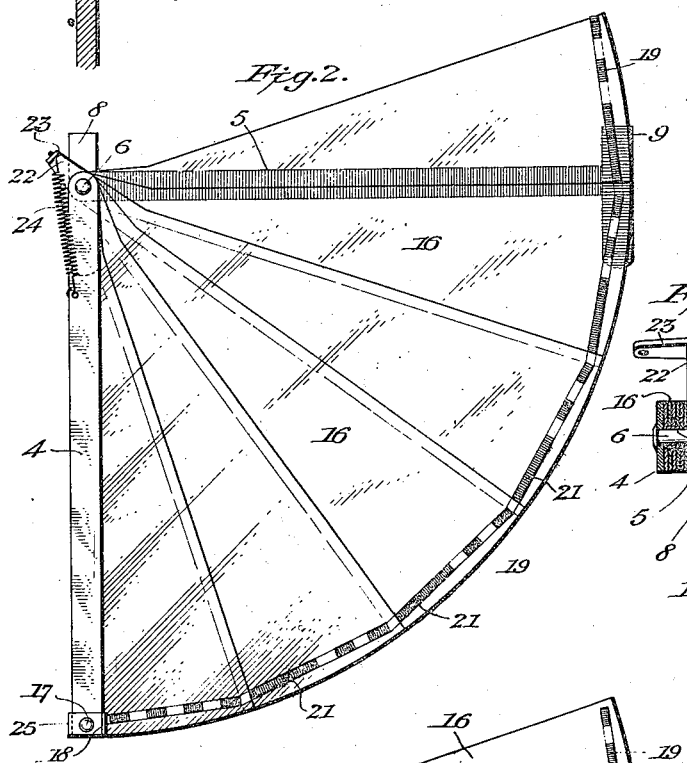
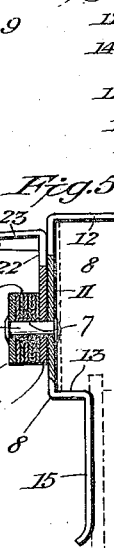
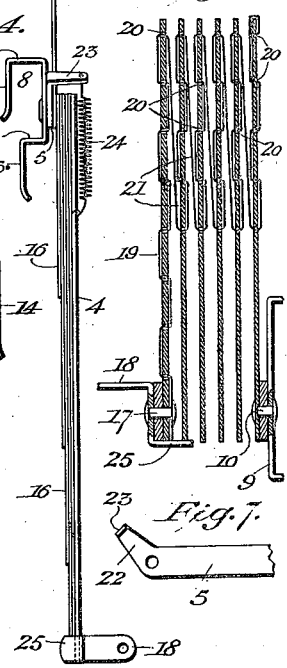
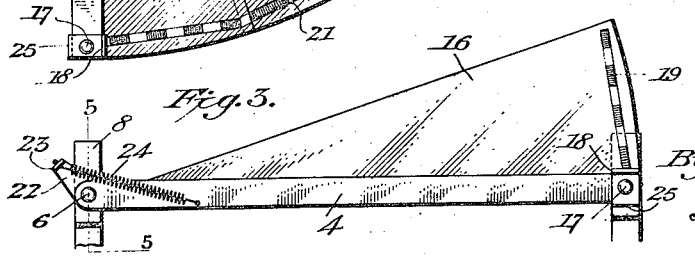
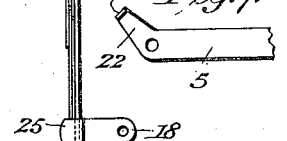
Inventor:
James C. Dorsey.
Jeptha W. Vaughn.
By H. S. Bailey Attorney.

Patented Oct. 7, 1924.

1,510,984

UNITED STATES PATENT OFFICE.

JAMES C. DORSEY AND JEPTHA W. VAUGHN, OF DENVER, COLORADO.

FOLDING GLARE DIMMER FOR AUTOMOBILE WINDSHIELDS.

Application filed September 16, 1922, Serial No. 588,693. Renewed March 3, 1924.

*To all whom it may concern:*

Be it known that we, JAMES C. DORSEY and JEPTHA W. VAUGHN, citizens of the United States of America, residing at the city and county of Denver and State of Colorado, have invented new and useful Folding Glare Dimmers for Automobile Windshields, of which the following is a specification.

Our invention relates to improvements in folding glare dimmers for automobile wind shields.

The object of the invention is to provide a dimmer of this character which is adapted to be detachably secured to the upper bar of the wind shield, and which is adapted to be folded to occupy a position back of the upper bar of the wind shield and out of view, when not required for use, and which can be instantly opened out, when required, to occupy a position on the wind shield directly in front of the driver of the car.

Further, to provide a dimmer, comprising a series of sections of suitable colored transparent, non-frangible material, preferably pyroxylin, which are pivotally mounted at one end between the ends of two bars and connected together and to the bars at their outer ends, in such manner as to be folded and opened in the manner of a folding fan; one of said bars being detachably secured to the top bar of the wind shield while the other bar is adapted to be swung on its pivot to open or close the sections in fan-like manner.

Further, to provide in connection with the swinging bar of said dimmer, a contraction coil spring which is connected to the swinging bar and to a fixed part of the dimmer in such position relatively to the pivoted end of said arm that when the arm is swung to close the dimmer, the spring is thereby swung to one side of the pivoted axis of the arm and acts to assist in closing the dimmer and holding the same closed, and when the arm is swung to open the dimmer, the spring is thereby shifted to the opposite side of the pivotal axis of the arm, and acts to hold the dimmer open.

These objects are accomplished by the device illustrated in the accompanying drawings in which:

Fig. 1 is a front view of an ordinary automobile wind shield showing our improved light glare dimmer attached thereto and opened out in position for use.

Fig. 2 is a greatly enlarged view of the dimmer shown in Fig. 1 and detached from the wind shield.

Fig. 3 is a side view of the glare dimmer in folded position.

Fig. 4 is an edge view of Fig. 2.

Fig. 5 is a section view, full size, on the line 5—5 of Fig. 3.

Fig. 6 is a sectional diagrammatic view showing the manner in which the outer ends of the pivoted dimmer sections are connected by a flexible lacing, and Fig. 7 is a view of the pivot end portion of that bar of the dimmer which is adapted to be attached to the wind shield.

Referring to the accompanying drawings:

The numeral 1 indicates an ordinary automobile wind shield which is divided centrally into upper and lower members, which are hinged to uprights 2 in the usual manner.

To the upper bar or frame member 3 of the windshield and on that end portion of the same, opposite the driver, is secured the improved light glare dimmer which is arranged and constructed in the following manner:

Two thin metal bars 4 and 5 are pivotally connected at one end by a pin or rivet 6, upon which is placed a spacing sleeve 7 which defines a space of suitable width between the ends of the bars. The rivet 6 also secures a spring clip 8 to this end of the bar 5, and a similar clip 9 is secured to the opposite end of the bar by a rivet 10. These clips comprise vertical portions 11 which are secured to the bar 5 and which terminate at their ends in horizontal portions 12 and 13 which are spaced a distance equal to the width of the upper frame member or bar 3 of the windshield. The upper horizontal portions 12 of the clips are equal in length to the thickness of the bar 3, and they terminate in depending resilient hook portions 14 which are parallel with the portions 11 and about half the length of the said portions 11. The lower horizontal portions 13 of the clips are of a length equal to half the thickness of the bar 3, and they terminate in resilient depending members 15. The clips 8 and 9 are sprung over the bar 3, so that the bars are held in the clips in the manner shown in Fig. 5 and the depending members 15 of the clips press resiliently against the glass of the windshield, while the hook members 14 press resiliently against the side of the bar 3, and thus hold the bar 5 against accidental disconnection from the bar 3.

The member 15 of the clip 8 also bears against the inner edge of the adjacent end bar of the wind shield and prevents the dimmer from slipping off of this end of the wind shield.

Upon the sleeve 7 of the rivet 6, which connects the inner ends of the bars 4 and 5, are mounted a plurality of dimmer sections or blades 16, which are of a suitable non-frangible material, preferably, the inner ends of which are of the same width as the bars 4 and 5, but the blades increase in width, towards their outer ends which are of a width equal to one-third of the length of the blade, when six blades are employed as shown in the drawings, and the outer edge of each blade describes an arc whose center is the pivot pin 6. The outer end of the outside blade 16 is secured to the outer end of the bar 5 by the pivot 10, which secures the clip 9 to the said bar, and the outer end of the inner blade 16 is secured to the outer end of the bar 4 by a rivet 17 which also secures a combined stop and thumb piece 18, to be presently described, and the outer ends of all of the blades are connected by a fabric lacing 19, which limits the movements of the blades with respect to each other both in opening and closing the dimmer. In order to connect the dimmer blades with the lacing 19, each of the said blades is provided adjacent its outer end with a number of small slots 20, one of which is located centrally of the width of the blade, and the others are spaced between the central slot and the adjacent upper corner of the blade, as will appear by reference to Figs. 2 and 6.

The tape or lacing 19, is secured in the uppermost slot of the blade 16 which is secured to the bar 5 and is passed back and forth through the slots 20, in such order that after passing through the central slot, the loose end of the lacing will be on the inner face of the blade. From the first blade, the loose end of the lacing is passed down back of the next succeeding blade and through the uppermost slot therein and thence back and forth through these slots to the central slot, then down over the inner face of this blade and back of the next succeeding or third blade and through the slots in this blade and the remaining blades in the same manner until the last blade is reached and this blade is provided with a plurality of equidistant slots, through which the lacing is passed in the above described manner and its terminal end is secured to the bar 4 by the rivet 17 which secures this last blade, together with the thumb piece 18, to the said bar.

In forming the blades 16 their upper edges are cut on radial lines which pass through the axis of their pivoted ends while their lower edges radiate from the circumference of a circle which defines the width of their pivotal ends. By this arrangement, when the dimmer is opened out to its full extent, the lower edge of one blade will overlap the upper edge of the next succeeding blade for a space of approximately one-eighth of an inch, it being understood that the blades are of such width at their outer ends that five of them, when opened out as shown in Fig. 2 define an arc of one-fourth of a circle.

It will thus be seen that the lacing 19 is of such length as to allow of the dimmer being opened out to the position shown in Fig. 2 and the loose portion 21 of the lacing, which extends from the center slot of one blade to the uppermost slot of the next succeeding blade, is of such length that when the blades are closed, as shown in the diagrammatic view Fig. 6, they limit the swing of each blade with respect to the next succeeding blade so that the edges of all of the blades will lie flush.

The bar 5, which is secured to the wind shield, terminates at its pivot end in a short arm 22, which inclines at an angle of forty-five degrees to the arm 5, and the arm 22 in turn, terminates in a right angled extension 23 to which one end of a contraction coil spring 24 is secured, and the other end of this spring is fastened to the bar 4 at a suitable distance beyond the pivot 6. When the dimmer is closed, as in Fig. 3, the spring 24 lies above the pivot 6, and therefore exerts an upward lifting pull on the arm 4, which holds it in a horizontal position and thus prevents the dimmer swinging to an open position, but when the dimmer is opened out to the position shown in Fig. 2, the spring passes over the pivot 6, or in other words, is shifted from the position shown in Fig. 3 to the position shown in Fig. 2 and exerts a pull which holds the fan open, as will be understood.

The thumb piece 18 is grasped between the finger and thumb, in opening or closing the dimmer and this thumb piece is bent to form a stop 25, which engages the edge of the end bar of the wind shield, when the dimmer is opened for use, and thus prevents any strain or pull on the lacing 19 which connects the outer ends of the dimmer blades.

When the dimmer is in position on the wind shield, the uppermost blade remains permanently in a horizontal position and thus serves to shield the remaining blades from the effect of dust and grit when they are swung into closed position.

In operation the dimmer is applied to the wind shield in the manner shown and described, and when not required for use is closed or swung up to the position shown in Fig. 3, when it is out of the line of vision of the driver of the car, and in this position it is held by the spring 24.

When required to shut out the glare from the lights of approaching cars, the driver grasps the thumb piece 18 and opens the dimmer out to the position shown in Figs. 1 and 2, in which position the dimmer is held by the spring 24, and thereby enables the driver to look straight ahead without being blinded by the glare from the approaching cars.

Having described our invention, what we claim as new and desire to secure by Letters Patent, is:

1. In a light glare dimmer of the character described, the combination with an automobile wind shield frame; of a pair of thin, metal, spaced bars connected together at one end by a pivot pin and clips on one of said bars whereby the same may be detachably connected to said wind shield frame, a plurality of suitably colored, non-frangible blades mounted at one end upon said pivot pin and between said metal bars, the two outer blades being secured to the adjoining metal bars, flexible means connecting the outer ends of the blades which permits them to be opened out in fan-like manner or folded to occupy the space of a single blade, a contraction coil spring, one end of which is secured to the fixed metal bar and the other end to the movable metal bar in such manner that the spring lies on one side of the pivot pin when the dimmer is open and on the other side thereof when the dimmer is closed, and a thumb hold on the outer end of the movable bar.

2. In a light glare dimmer of the character described, the combination with an automobile wind shield frame; of a pair of thin metal bars, a pivot pin extended through one end of said bars and a sleeve on said pin for spacing said bars; clips on one of said bars whereby the same is secured to said wind shield frame, a thumb hold on the outer end of the movable bar, having a projecting stop which is adapted to engage the inner edge of the end member of the wind shield frame when this bar is turned to stand at right angles to the fixed bar, said fixed bar having a short extension on its pivot end which lies at an angle of forty-five degrees to the said bar, a contraction coil spring one end of which is secured to said extension, its other end being secured to the outer edge of the movable bar beyond the pivot, a plurality of colored, non-frangible blades mounted at one end on said spacing sleeve and having radial side edges, said blades being provided with slots near their outer ends, and a ribbon-like lacing which is passed through said slots to connect said blades whereby they may be opened out in fan-like manner or folded to occupy the space of a single blade, the edge of one blade overlapping the edge of the next succeeding blade when the dimmer is opened, the outer blades being secured to the adjoining metal bars.

In testimony whereof we affix our signatures in presence of two witnesses.

JAMES C. DORSEY.
JEPTHA W. VAUGHN.

Witnesses:
G. SARGENT ELLIOTT,
EMILY ROBERTS HANNING.